(12) United States Patent  
Schuh et al.

(10) Patent No.: US 7,855,632 B1  
(45) Date of Patent: Dec. 21, 2010

(54) TEMPERATURE SENSOR AND METHOD OF MANUFACTURING

(75) Inventors: William C Schuh, Delavan, WI (US); Arthur O Volbrecht, Genoa City, WI (US)

(73) Assignee: Watlow Electric Manufacturing Company, St. Louis, MO (US)

( * ) Notice: Subject to any disclaimer, the term of this patent is extended or adjusted under 35 U.S.C. 154(b) by 176 days.

(21) Appl. No.: 11/070,562

(22) Filed: Mar. 2, 2005

(51) Int. Cl.
*H01C 7/04* (2006.01)

(52) U.S. Cl. .......................................... 338/28; 374/185

(58) Field of Classification Search ............... 338/22 R, 338/25, 28, 221, 226, 229, 232–234, 236, 338/238, 250, 273, 274, 249; 219/510, 523, 219/544; 374/183; 29/612
See application file for complete search history.

(56) References Cited

U.S. PATENT DOCUMENTS

| | | | |
|---|---|---|---|
| 4,265,117 A * | 5/1981 | Thoma et al. | 338/28 |
| 4,349,727 A * | 9/1982 | Churchill | 219/544 |
| 4,778,537 A | 10/1988 | Thom et al. | |
| 4,934,831 A * | 6/1990 | Volbrecht | 338/28 |
| 4,937,552 A | 6/1990 | Lam | |
| 5,037,488 A | 8/1991 | Wienand | |
| 5,131,759 A | 7/1992 | Eiermann et al. | |
| 5,161,894 A | 11/1992 | Bourigault | |
| 5,209,571 A | 5/1993 | Kendall | |
| 5,749,656 A | 5/1998 | Boehm et al. | |
| 6,130,598 A | 10/2000 | Katsuki et al. | |
| 6,164,819 A | 12/2000 | Moriwake et al. | |
| 6,272,735 B1 | 8/2001 | Moriwake et al. | |
| 6,466,123 B1 | 10/2002 | Kuzuoka et al. | |
| 6,501,366 B2 | 12/2002 | Takahashi et al. | |
| 6,568,849 B1 | 5/2003 | Chen et al. | |
| 6,639,505 B2 | 10/2003 | Murata et al. | |
| 6,762,671 B2 | 7/2004 | Nelson | |
| 6,829,820 B2 | 12/2004 | Adachi et al. | |
| 6,830,374 B1 | 12/2004 | Gray | |
| 6,854,882 B2 | 2/2005 | Chen | |
| 6,880,969 B2 | 4/2005 | Adachi et al. | |
| 6,899,457 B2 | 5/2005 | Kurano | |
| 2002/0006155 A1 | 1/2002 | Wienand et al. | |
| 2002/0090019 A1 | 7/2002 | Marato et al. | |
| 2002/0125417 A1 | 9/2002 | Damaschke | |
| 2002/0136263 A1 | 9/2002 | Wilkins | |
| 2003/0072352 A1 | 4/2003 | Muziol | |
| 2003/0081652 A1 | 5/2003 | Wienand et al. | |
| 2004/0218662 A1 | 11/2004 | Hanzawa et al. | |
| 2004/0227636 A1 | 11/2004 | Gul | |
| 2005/0157775 A1 | 7/2005 | Chapman | |
| 2007/0171959 A1 * | 7/2007 | Irrgang et al. | 374/185 |

* cited by examiner

*Primary Examiner*—Elvin G Enad
*Assistant Examiner*—Joselito Baisa
(74) *Attorney, Agent, or Firm*—Brinks Hofer Gilson & Lione

(57) ABSTRACT

A temperature sensor includes an autonomous sensing element and a plurality of conductive wires connected to the sensing element. An electrical insulator surrounds the sensing element and the conductive wires for firmly holding the sensing element and conductive wires. The insulator includes substantially crushed and compacted powder insulation. A tube encases the insulator in a compressed manner and has a first end, a second end, a first portion having a first inside diameter located in the proximity of the first end and a second portion having a second inside diameter. The second inside diameter being greater than the first inside diameter. The sensing element is positioned within the second portion of the tube. Methods of manufacturing a temperature sensor are also included.

37 Claims, 12 Drawing Sheets

Section A—A

TEMPERATURE SENSOR AND METHOD OF MANUFACTURING

FIELD OF THE INVENTION

The invention relates generally to temperature sensors, and more particularly to temperature sensors with a robust configuration against vibration damage and a method of manufacturing the same.

BACKGROUND OF THE INVENTION

The commonly used temperature sensors include thermocouples, resistive temperature devices (RTDs), thermistors, diode sensors, and transistor temperature sensors. The common form of these temperature sensors is a sensing element with extension wires connecting the sensing element to a remote temperature reading device. The sensing element can be a hot junction of two dissimilar metals, an RTD element, a thermistor bead, a diode, or a transistor. The electrical resistance or electrical output or characteristic of the sensing element changes with temperature. Determining the change in the electrical characteristics of the sensing element results in the determination of the temperature of the sensing element, and hence the temperature of an object in the vicinity of the sensing element. Due to the delicacy of the sensing element and the extension wires, a metal tube or a sheath generally surrounds the extension wires and the sensing element and an insulating material is provided to protect the wires and sensing element.

Various attempts have been made to provide a robust configuration for temperature sensors. One common method of manufacturing a sensor is to encase the extension wires and the sensing element in a tube and fill the tube with an insulating powder. The insulating powder is then fired to form a hard and brittle insulator. However, this method produces a sensor that has a hard brittle ceramic insulator that cannot be bent and is susceptible to damage from vibration or impact.

Another common method of manufacturing a sensing element is to provide a preformed crushable ceramic insulator around the extension wires before the tube is assembled. The extension wires are placed inside the preformed crushable insulator and the package is placed into a tube with the sensing element being located near an end of the tube that may have been crimped or otherwise narrowed. The sensing element is not surrounded by insulating material. Thereafter, the main body portion is swaged to reduce the outer diameter of the main body portion thereby compacting the crushable ceramic insulator into a crushed powder around the extension wires. As a result, the extension wires are held in place by the crushed and compacted ceramic powder with the sensing element remaining in an open un-insulated inner space defined by the narrowed portion. After the preformed insulator is crushed, a ceramic insulating powder is introduced through the opened narrowed end of the tube and packed around the sensing element. The opening of the tube is then closed.

Another common method of manufacturing a temperature sensor is to form the leadwire portion separate from the sensing element by providing a preformed crushable ceramic insulator around the extension wires before the tube is assembled. The extension wires are placed inside the preformed crushable insulator and the package is placed into a tube. Thereafter, the main body portion is swaged to reduce the outer diameter of the main body portion thereby compacting the crushable ceramic insulator into a crushed powder around the extension wires. As a result, the extension wires are held in place by the crushed and compacted ceramic powder with the sensing element remaining in an open un-insulated inner space defined by the narrowed portion. After the preformed insulator is crushed, a cavity in the crushed insulation is formed to accommodate the introduction of the sensing element. After the sensing element is attached to the leadwire in the cavity the remaining space in the cavity is filled with insulating powder and the tube is capped.

These methods of manufacturing a temperature sensor do not produce a robust structure for the temperature sensor and in particular the sensing element. The ceramic insulating powder is loosely distributed around the sensing element and often does not provide sufficient protection for the sensing element against vibration or shock. Moreover, this method requires many separate and costly manufacturing steps.

SUMMARY OF THE INVENTION

The inventors hereof have designed a temperature sensor that has improved properties against impact and vibration, and that can be bent or otherwise have its shape changed, without damaging or destroying the operational ability of the temperature sensor. This also includes improved methods of manufacturing temperature sensors that can impart one or more of these properties to the manufactured temperature sensors while also improving the manufacturing processes.

According to one aspect of the invention, a temperature sensor includes a sensing element and a plurality of conductive wires for electrically connecting the sensing element to a temperature reading device. An electrical insulator surrounds the sensing element and the conductive wires to hold the conductive wires and the sensing element in place. The insulator includes substantially crushed and compacted powder insulation. A tube encases the insulator in a compressed manner and has a first portion with a first inside diameter, and a second portion with a second inside diameter. The sensing element is positioned within the second portion of the tube.

According to another aspect of the invention, a method of manufacturing a temperature sensor having an autonomous temperature sensing element, conductive wires, an electrical insulator and a tube having an inside diameter, an outer diameter, a first end, and a second end. The method includes connecting conductive wires to a sensing element, increasing the inside diameter of a second portion of a tube adjacent to the second end, and placing an insulator over the sensing element and the conductive wires. The second end of the tube is closed and the insulator is placed over the conductive wires and the sensing element. The outer diameter of the tube is reduced to a predetermined diameter with the reducing process crushing and compressing the insulator into a compacted powder compacted about the sensing element and the conductive wires.

According to still another aspect of the invention, a method of manufacturing a temperature sensor having an autonomous temperature sensing element, conductive wires, an electrical insulator, and a tube having an inside diameter, an outer diameter, a first end, and a second end. The method includes connecting the conductive wires to the autonomous temperature sensing element, closing the second end of the tube, and placing the insulator over the conductive wires and the sensing element. The insulator is inserted into the tube and the outer diameter of the tube is reduced to a predetermined diameter. The reduction process crushes the insulator into a powder and compacts the sensing element and the conductive wires within the crushed insulator powder.

According to yet another aspect of the invention, a method of manufacturing a temperature sensor having an autonomous temperature sensing element, conductive wires, an electrical insulator, a seal, and a tube having a first end and a second end, a first portion having a first inside diameter located in the proximity of the first end, and a second portion having a second inside diameter, the second inside diameter being greater than the first inside diameter. The manufacturing method includes connecting the conductive wires to the autonomous temperature sensing element, and closing the second end of the tube. The tube is placed over the conductive wires and the sensing element with a space being formed between the tube and the conductive wires and the sensing element. The sensing element is disposed within the second portion of the tube. An insulating powder is filled into the space and a seal is placed into the first end of the tube and about the conductive wires that extend from the tube. The outer diameter of the tube is reduced to a predetermined diameter. The reduction process compresses the insulating powder and the end seal and compacts the sensing element and the conductive wires within the compressed insulating powder.

According to still another aspect of the invention, a temperature sensor is manufactured by a method including preparing a plurality of conductive wires, an autonomous temperature sensing element having wire leads, a wire insulator, a sensing element insulator, an end seal, and a tube having an inside diameter, an outer diameter, a first end, and a second end. The second end of the tube is capped and each conductive wire is connected to an associated wire lead of the sensing element. The conductive wires are placed within wire channels defined by the wire insulator and the end seal and the sensing element are placed into a cavity defined by the sensing element insulator. The sensing element, the wire insulator, and the end seal are inserted into the tube and outer diameter of the tube is reduced to a predetermined diameter. The reduction process crushes the wire insulator and the sensing element insulator into a compressed substantially powdery insulation and compacts the sensing element and the conductive wires within the compressed insulation. The reduction process also compresses the seal to substantially sealing the second end of the tube.

According to still another aspect of the invention, a temperature sensor having a sensing element, conductive wires, an insulator, and a tube having an inside diameter, an outer diameter, a first end, and a second end, is manufactured by the method including connecting the conductive wires to the sensing element and increasing the inside diameter of a portion of the tube adjacent to the second end. The increased inside diameter portion is dimensioned as a function of the length of the sensing element and the position of the sensing element within the tube. The second end of the tube is closed and the insulator is placed over the conductive wires and the sensing element. The insulator is inserted into the tube with the sensing element being disposed within the increased inside diameter portion of the tube. The outer diameter of the tube is reduced to a predetermined diameter with the reduction process crushing and compressing the insulator and compacting the sensing element and the conductive wires within the crushed insulator.

According to another aspect of the invention, a temperature sensor having a sensing element, conductive wires, an insulator, and a tube initially having a substantially consistent inside diameter, an outer diameter, a first end, and a second end, manufactured according to the method including connecting the conductive wires to the sensing element, and increasing the inside diameter of a portion of the tube adjacent to the second end. The increased inside diameter portion is dimensioned as a function of the length of the sensing element and the position of the sensing element within the tube. The second end of the tube is closed and the tube is placed over the conductive wires and the sensing element forming a space between the tube and the conductive wires and the sensing element with the sensing element being disposed within the increased inside diameter. An insulating powder is filled into the space and the outer diameter of the tube is reduced to a predetermined diameter. The reduction process crushes and compresses the insulating powder and compacts the sensing element and the conductive wires by the insulating powder.

Further aspects of the invention will be in part apparent and in part pointed out below. It should be understood that various aspects of the invention may be implemented individually or in combination with one another. It should also be understood that the detailed description and drawings, while indicating certain exemplary embodiments of the invention, are intended for purposes of illustration only and should not be construed as limiting the scope of the invention.

BRIEF DESCRIPTION OF THE DRAWINGS

The invention will become more fully understood from the detailed description and the accompanying drawings, wherein.

DETAILED DESCRIPTION OF EXEMPLARY EMBODIMENTS

Temperature sensors and their manufacturing methods in accordance with the teachings of various exemplary embodiments of the invention will now be described in greater detail. The following description of the exemplary embodiments is merely exemplary in nature and is not intended to limit the invention, its applications, or uses.

Figure 1:
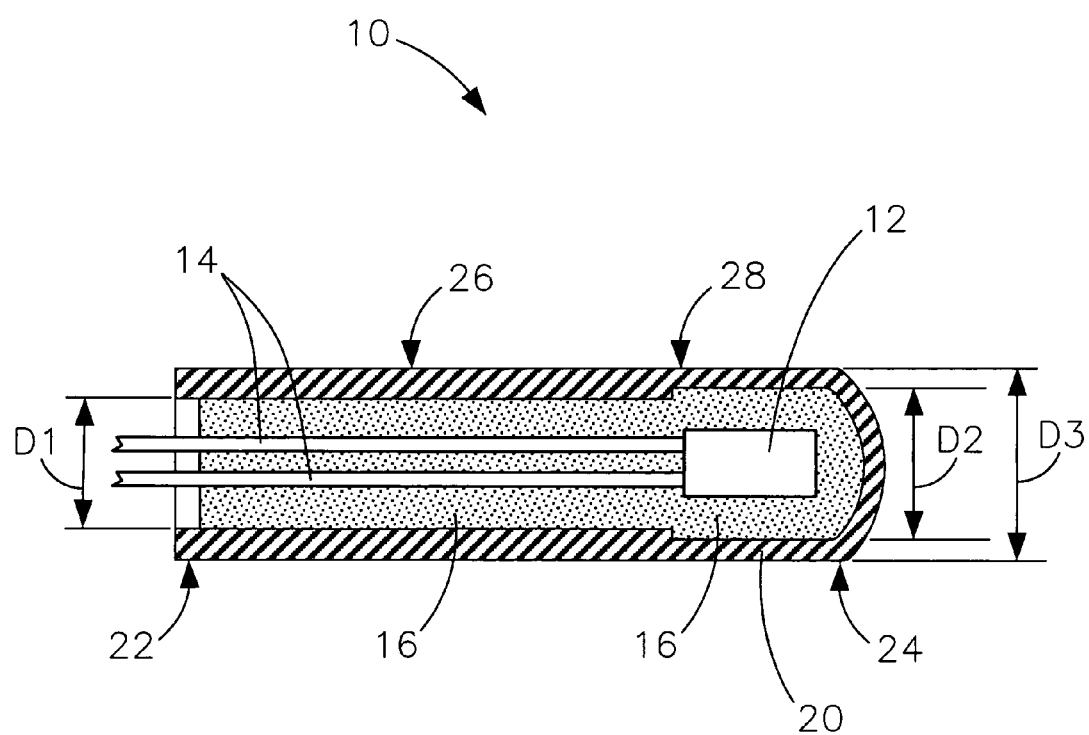
FIG. 1 is a cross-sectional view of a temperature sensor in accordance with a first exemplary embodiment of the invention.
Figure 2:
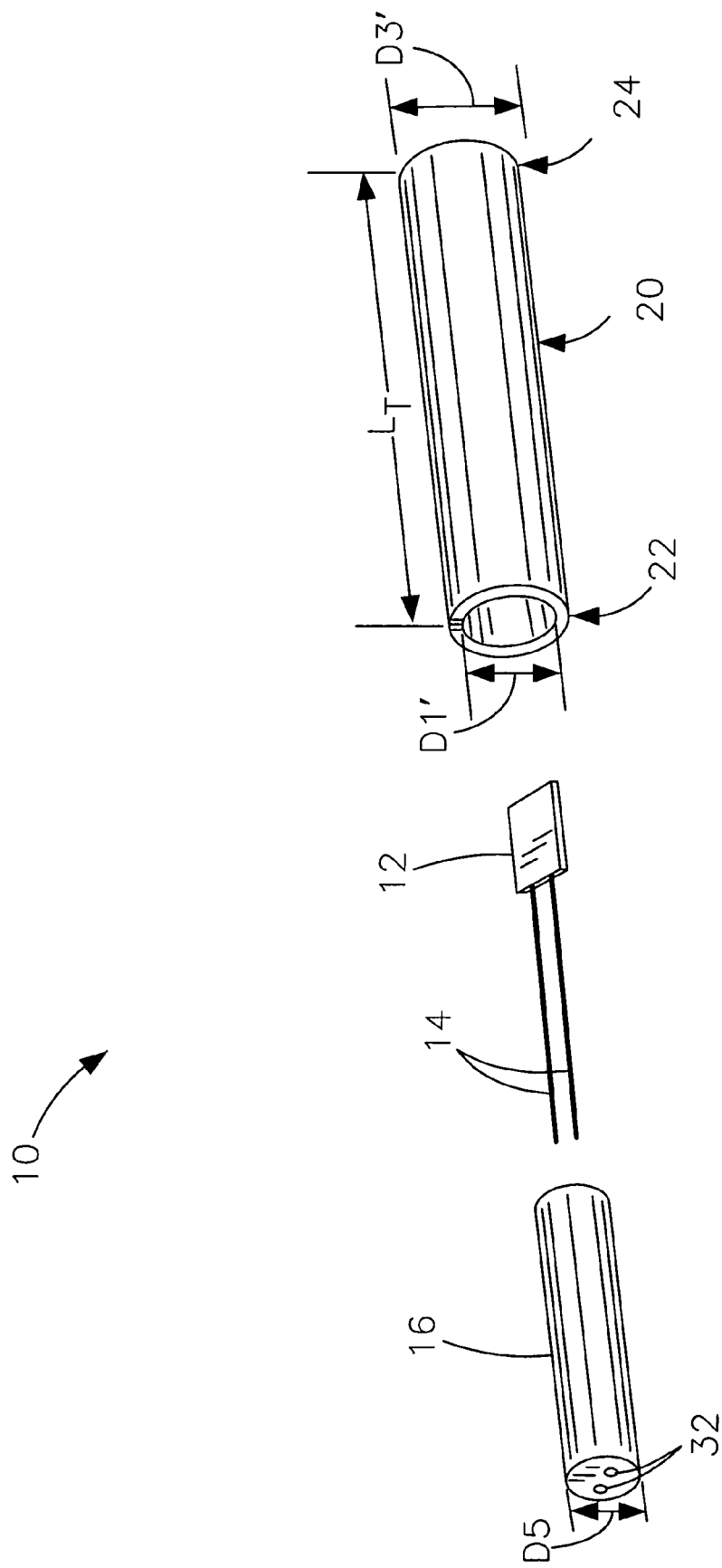
FIG. 2 is an exploded view of the temperature sensor of FIG. 1, showing the constituent components in their original shape according to one embodiment of the invention.

Referring to FIG. 1, a temperature sensor in accordance with one exemplary embodiment of the invention is illustrated and generally indicated by reference numeral 10. An autonomous sensing element 12 is coupled to one or more conductive wires 14, with two being illustrated by way of example. The conductive wires 14 are configured to be connected to a remote temperature reading device (not shown). The autonomous temperature sensing element 12 can be an RTD element (wire wound type or thin film type), a thermistor, a transistor, or a diode, by way of example only, that generates a signal indicative of a sensed temperature. The signal is transmitted through the conductive wires 14 to the temperature reading device (not shown).

The number of the conductive wires 14 can depend on the application of the temperature sensor 10 or the type of autonomous temperature sensing element 12 selected for a particular application. In various embodiments, one to eight conductive wires 14 can be used to provide for temperature sensing. The conductive wires 14 can be made of any type of electrically conductive material suitable for the desired environment or temperature sensor, such as nickel, "Alloy 19", "Alloy 20", "Alloy 600", and platinum, by way of example.

In some embodiments, the sensing element 10 can include wire leads (not shown), such as are typical of a RTD or other semiconductor sensing device. The wire leads can be coupled to the conductive wires 14 such that the conductive wires provide the electrical connectivity of the sensing element 10 to the temperature reading device. In some embodiments, each wire lead of the sensing element 10 is electrically coupled to an associated conductive wire 14, and in embodiments this includes fixedly coupling. Such coupling can be by any means and can include, in one embodiment, welding one or more weld points. In one embodiment, a single weld point is used to coupled each wire lead to each associated conductive wire 14.

Additionally, in some embodiments the conductive wires 14 can include two or more segments of wire connected between the lead wires of the sensing element 12 and the temperature reading device. In such embodiments, a first segment (not shown) of the conductive wires 14 is coupled to the lead wires of the sensing element 12 and a second segment (not shown) of the conductive wires 14 is coupled to the first segment. Each coupling of segments can be by one or methods described above. In this manner, the conductive material for each segment can be optimized to provide improved operation, sensitivity, and/or durability of the sensor. For example, the conductive material for the first segment can be selected from one that performs well in a high heat environment, but that may be costly. The conductive material for the second segment can be selected that is less costly, but does not perform as well at high heat, since the second segment of the sensor is likely to be located at a lower temperature than the first segment. In such embodiments, the one or more segments of the conductive wires 14 and their coupling points are encased and compacted in an insulator 16, which is described in greater detail in the following.

The electrical insulator 16 surrounds the sensing element 12 and the conductive wires 14 to firmly hold the sensing element 12 and the conductive wires 14 in place and insulate the conductive wires 14 from each other. The insulator 16 includes substantially compacted powder insulation. The compacted powder insulation can be composed of, by way of example, a ceramic material, such as magnesium oxide (MgO), aluminum oxide (Al2O3), Hafnia, or boron nitride (BN).

A tube 20 is provided around the insulator 16. The tube 20 encases the insulator 16 in a compressed manner such that the insulator 16 is compressed such as to substantially fill voids within the tube 20. The tube 20 has a first end 22 and a second end 24 adjacent to the sensing element 12, and an outer diameter D3. The second end 24 of the tube 20 is closed and can be closed by cap-welding or crimping, for example. The first end 22 of the tube 20 can also be at least partially closed, such as, for example by crimping or otherwise reducing the outer diameter D3 of the tube 20 or sealed by using a sealing device (not shown).

The tube 20 has a first portion 26 that has an inside diameter D1 and a second portion 28 that has an inside diameter D2. The first inside diameter D1 is smaller than the second inside diameter D2. While the inside diameters can be of any distance, in some embodiments the first inside diameter D1 is between about 0.22 inches to about 0.28 and the second inside diameter D2 is between about 0.20 inches to about 0.30 inches. In one exemplary embodiment, the difference between the first inside diameter D1 and the second insider diameter is about 0.02 inches.

The sensing element 12 is positioned within the second portion 28 of the tube 20 having the second inside diameter D2 and the conductive wires 14 are located or extend through the first portion 26 having the first inside diameter D1. The tube 20 can be made of any type of material, and in various embodiments, can be made of, by way of example, stainless steel, Alloy 600, platinum, or Nicrobell® (Nicrobell is a registered US trademark of Nicrobell Pty Ltd, Aust.).

As noted above, in some embodiments a sealing device can be positioned inside the first end 22 and can include one or more wire holes or channels for encasing portions of the conductive wires 14 that extend from the tube 20. In some embodiments, the seal can include one or more glands or glands seals on an outer diameter of the end seal to aid in sealing the tube 20. Such glands can be of any design or configuration and can include one or more glands cut into the outer diameter of the seal. The end seal can be composed of any of a variety of seal materials, such as, by way of example, silicone, Teflon®, and plastic. Additionally, in some embodiments that include an end seal, the inside diameter of a portion of the tube 20 near the first end 22 can be increased to be greater than inside diameter D1 to provide for receiving the end seal. The increased diameter at the first end 22 can be made by drilling or similar manufacturing method. In some embodiments, the first end 22 can also be crimped or ring rolled about the end seal to secure the end seal within the first end 22.

The substantially compacted powder insulator 16 is compacted within the tube 20 and about the sensing element 12 within the second portion 28 and the conductive wires 14 within the first portion 26. The compacted powder insulator 16 in the second portion 28 is generally compacted at a pressure that is less than or equal to the compacted pressure associated with the compacted powder in the first portion 26, due to the second portion 28 having the inside diameter D2 that is greater than the inside diameter D1 of the first portion. In another embodiment, the insulator 16 in the first portion 26 has a density that is greater than the density in the second portion 28. In this manner, the conductive wires 14 and the sensing element 12 are compacted in the compacted powder of insulator 16 and protected from the negative impacts of vibration or impact. However, the sensing element 12 is also protected from undue or the extreme pressures related to the compacted powder insulator associated with the first portion 26.

Some embodiments of the invention include a method of manufacturing a temperature sensor, such as the exemplary temperature sensor 10 of FIG. 1, having an autonomous temperature sensing element 12, conductive wires 14, an electrical insulator 16, and a tube 20 having an inside diameter D1, D2, an outer diameter D3, a first end 22, and a second end 24. For example, one exemplary embodiment for manufacturing a temperature sensor 10 includes connecting conductive wires 14 to a sensing element 12, increasing the inside diameter of a portion of the tube 20 adjacent to the second end 24, and placing an insulator over the sensing element 12 and the conductive wires 14. The second end 22 of the tube 20 is closed and the insulator 16 is placed over the conductive wires 14 and the sensing element 12. An initial outer diameter D3' of the tube 20 is reduced to a predetermined outer diameter D3 with the reducing process crushing and compressing the insulator 16 into a compacted powder compacted about the sensing element 12 and the conductive wires 14.

Referring now to FIGS. 2-6, one such method of manufacturing a temperature sensor 10 in accordance with one exemplary embodiment of the invention is now described. The method begins in FIG. 2 where the various pre-assembled parts are shown. These include a sensing element 12, one or more conductive wires 14, an insulator 16, and a tube 20. The sensing element 12 is shown coupled to two conductive wires 14, by way of example. Additionally, the sensing element 12 can have wire leads (not shown) that can be coupled to the conductive wires 14.

The tube 20 is shown having first end 22 and second end 24, together defining a length $L_T$, an initial outer diameter D3', and an initial inner diameter D1'. The initial inner diameter D1' and initial outer diameter D3' relate to the diameters discussed above with regard to FIG. 1 except the prime indicators indicate the dimension prior to the reduction in the initial outer diameter D3' to outer diameter D3 during the manufacturing process. In some embodiments, the initial outer diameter D3' can be in the range of about 0.3 inches to about 1.0 inches, and in one preferred embodiment is about 0.313 inches. Similarly, the initial inner diameter D1' can be in the range of about 0.15 inches to about 0.2 inches, and in one embodiment is about 0.228 inches.

The insulator 16 is shown as having a monolithic cylindrical body, also by way of example, and having an outer diameter D5. The outer diameter D5 of insulator 16 is generally less than the initial inner diameter D1' of tube 20 thereby enabling the insertion of insulator 16 into the tube 20. In some embodiments, the outer diameter D5 is about 0.18 inches.

Figure 3A:
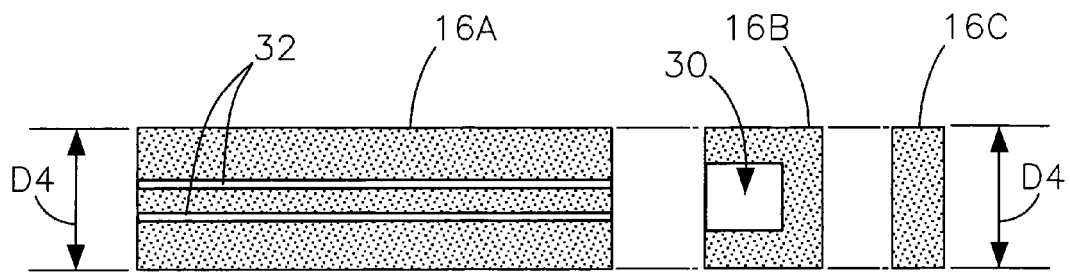
FIGS. 3A, 3B, and 3C are cross-sectional views of insulators in their initial shape according to some embodiments of the invention.
Figure 3B:
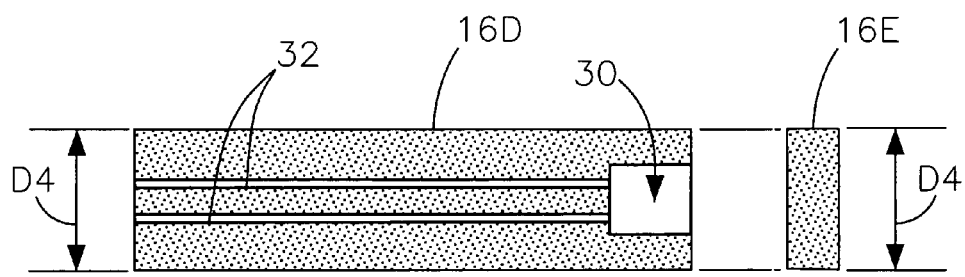
Figure 3C:
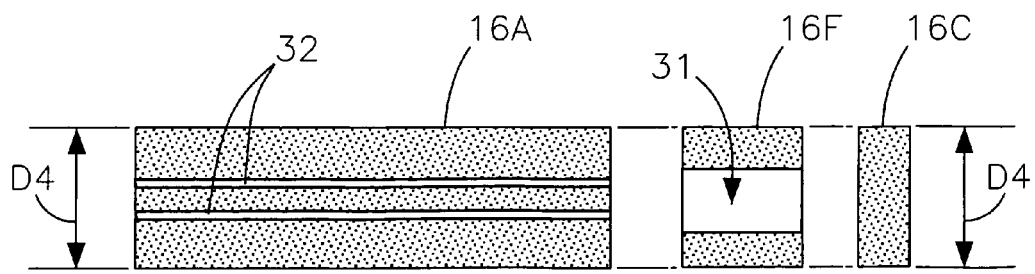

Some additional exemplary embodiments of the insulator 16 are shown in FIGS. 3A, 3B, and 3C. As shown, the insulator 16 can also be composed of a plurality of insulator portions or sections, each having a monolithic structure, and composed of a crushable and compactable insulation material as described above. In the exemplary embodiment of FIG. 3A, a first insulator portion 16A includes one or more wire channels 32 for receiving conductive wires 14. The first insulator portion 16A generally has a long cylindrical shape and dimensions as discussed with regard to FIG. 2. A second insulator portion 16B includes a cavity 30 dimensioned for receiving sensing element 12. The second insulator portion 16B generally is shorter than the first insulator portion 16A and can have a cylindrical shape with outer dimensions such as described with regard to FIG. 2. Additionally, while not shown, second insulator portion 16B can also have one end shaped to conform to a shape of the second end 24 of the tube 20 after second end 24 is closed. For example, this can be conical shaped or rounded. In some embodiments, the cavity 30 can be closed on one end as illustrated in FIG. 3A, or can define a hole through the center portion of second insulator portion 16B (not shown).

Additionally, in some embodiments one or more third insulator portions 16C can also be utilized or included in the sensor manufacturing process. The third insulator portion 16C can be dimensioned alone or in combination with multiple third insulator portions 16C to fill the second end 24 of the tube 20 thereby providing additional insulator material between the sensing element 12 and the second end 24 of the tube 20. For example, third insulator portion 16C can be a disk, a small cylinder, a cone, or a powder, by way of example.

In another exemplary embodiment, as shown in FIG. 3B, a first insulator 16D can have the cavity 30 formed at one end and the pair of wire channels 32 extending from the cavity 30 along the length of the monolithic insulator 16D to the end opposing the cavity 30. The cavity 30 can be configured and dimensioned to receive and enclose the sensing element 12 and, in some embodiments, have a shape corresponding to that of the sensing element 12. The cavity 30 is preferably slightly larger than the outer dimensions of the sensing element 12 to thereby enable the insertion of the sensing element 12. The wire channels 32 are configured to receive the conductive wires 14. The number of the wire channels 32 can correspond to the number of the conductive wires 14 and is not limited to the two shown in FIG. 3B. Additionally, an end insulator 16E can provide for sealing the outer portion of cavity 30 of first insulator portion 16D and providing end insulation inside the second end 24 of the tube 20. Additionally, one or more third portion insulators 16C, as discussed above, can also be utilized in the sensor manufacturing process.

In still another exemplary embodiment, as shown in FIG. 3C the first insulator portion 16A and the third insulator portion 16C are combined with a sensor element sleeve insulator 16F. The sleeve insulator 16F includes an inner cylindrical bore 31 that is dimensioned to receive the sensing element 12. In this embodiment, the sensing element 12 is coupled to the conductive wires 14. The conductive wires 14 are inserted into the wire channels of the first insulator portion 16A and the sleeve insulator 16F is placed over the sensing element 12. One or more third insulator portions 16C or possibly an insulating powder is inserted into the second end 24 of the tube 20. The sleeve insulator 16F and the first insulator portion 16A containing the sensing element 12 and the conductive wires 14, respectively, are then inserted into the tube 20, such that the sleeve insulator 16F is positioned adjacent to the second end 24 and within the second portion 28, when the tube 20 includes second portion 28. Thereafter, the manufacturing process can include the insertion of an end seal and crimping or ring rolling the first end 22. The tube 20 has the initial outer diameter D3' reduced to the outer diameter D3.

As should be known by those skilled in the art, the exemplary sensors and methods of manufacturing described herein associated with the insulator 16 can vary depending on the various insulator arrangements utilized in the manufacturing process. FIGS. 3A, 3B, and 3C provide only three exemplary arrangements for the insulator 16. Additional other arrangements for insulator 16 are also possible and are within the scope of the invention.

Figure 4A:
FIG. 4A is cross-sectional view of a tube used in the temperature sensor of FIG. 2 in its initial shape according to another embodiment of the invention.
Figure 4B:
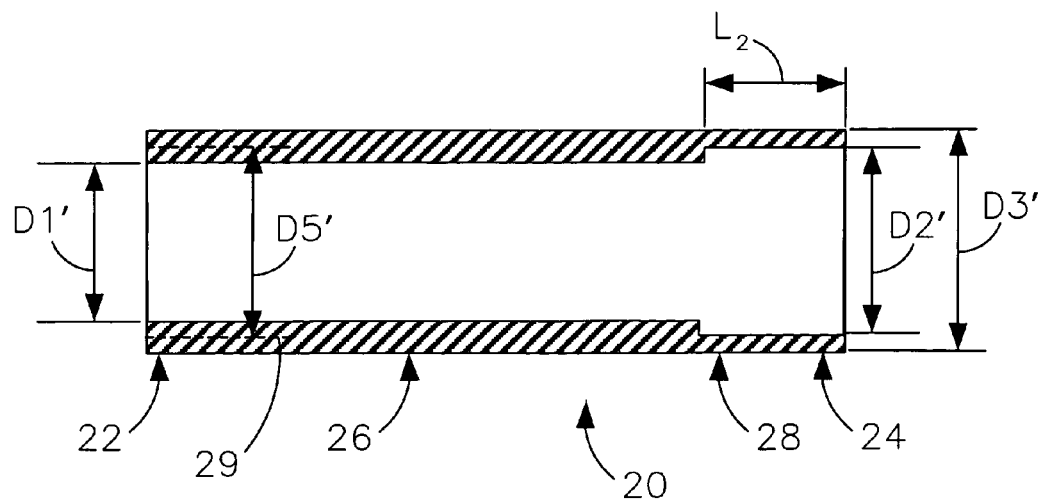
FIG. 4B is cross-sectional view of a tube used of FIG. 4A after increasing the inner diameter of a portion of the tube according to another embodiment of the invention.

As shown in FIGS. 4A and 4B, the tube 20 is initially an elongated tube 20 having a substantially uniform initial inside diameter D1' and a generally uniform initial outer diameter D3'. The tube 20 is processed to have the inside diameter D1' increased to an initial inside diameter D2' in a second portion 28 as shown in FIG. 4B. The initial inside diameter D2' of the second portion 28 is greater than the initial inside diameter D1' of the first portion 26. The second portion 28 has an initial inside diameter D2' which is increased from initial inside diameter D1' by any suitable method, such as, by way of example, drilling, cutting, pressing, stretching, or swaging. In one embodiment, the initial inside diameter D2' is increased from initial inside diameter D1' without altering the initial outer diameter D3' of the tube 20.

The length $L_2$ of the second portion 28 is generally defined or dimensioned as a function of the length of the sensing element 12, the expected position of the sensing element 12 within the tube 20 relative to second end 24, and any length required for the closure of the second end 24. Preferably, the length $L_2$ of the second portion 28 is equal to or greater than the length of the sensing element 12, thereby enabling the second end 24 to be closed and the sensing element 12 to be located completely within the second portion 28 before and after the reduction in the initial outer diameter D3' of the tube 20.

Figure 5A:
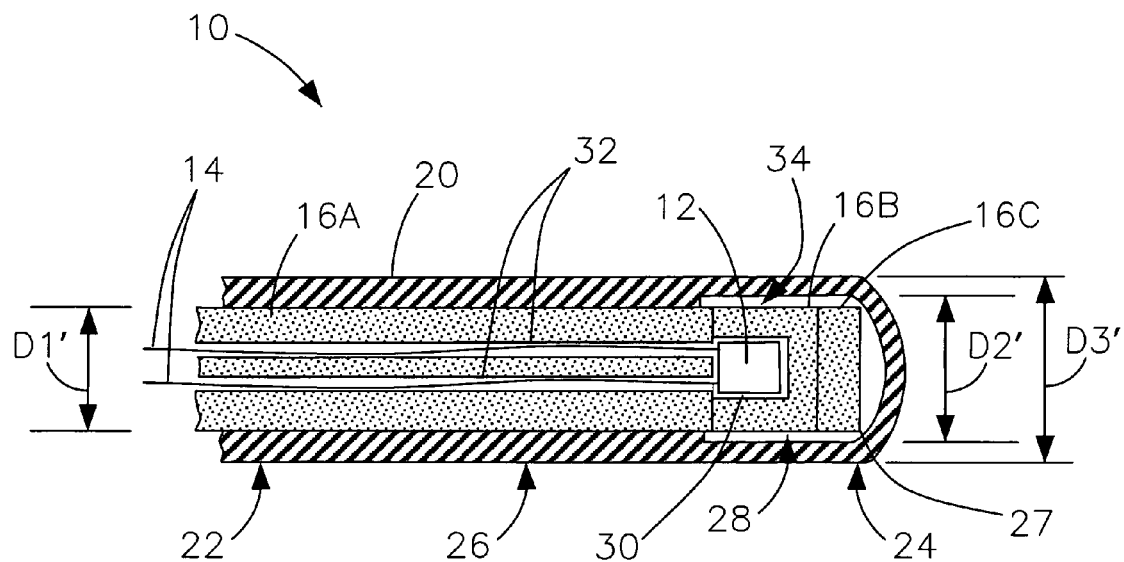
FIGS. 5A and 5B are cross-sectional views of assembled sensor assemblies before reduction of the outer diameter according to some embodiments of the invention.
Figure 5B:
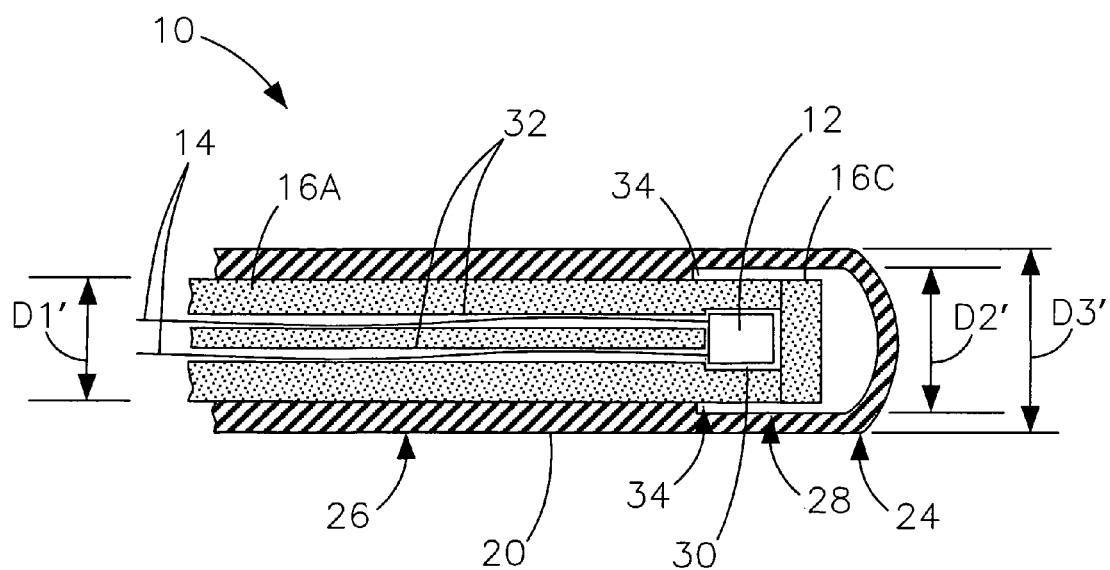
Figure 6:
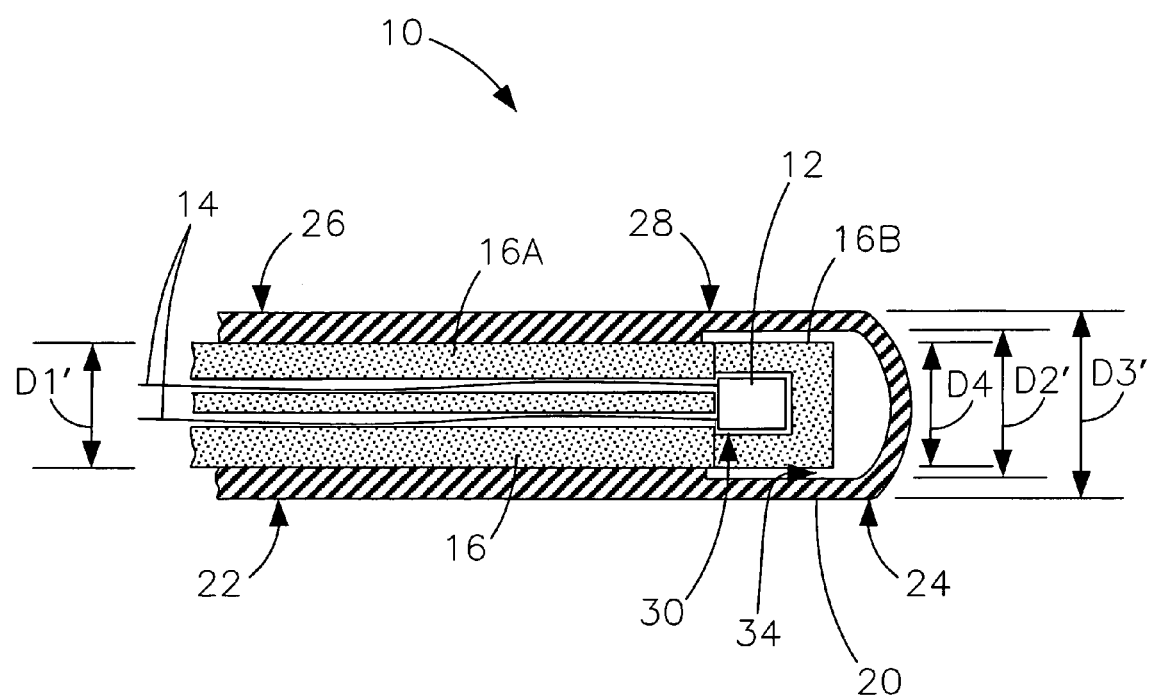
FIG. 6 is a cross-sectional view of an assembled temperature sensor of FIG. 1 before the outer diameter of the assembled temperature sensor is reduced according to another embodiment of the invention.

Referring to FIGS. 2-7, some embodiments of the method of manufacturing include coupling the conductive wires 14 to the sensing element 12. The sensing element 12 together with the conductive wires 14 are inserted into the insulator 16, which as shown in FIG. 6, by way of example, includes inserting the sensing element 12 into cavity 30 of the second insulator portion 16B and inserting the conductive wires into the channels 32 of first insulator portion 16A. The insulators 16A, 16B along with the enclosed conductive wires 14 and the sensing element 12 are inserted into the tube 20. The insulator 16 can be inserted into the tube 20 with the second end 24 being open or closed. In one of the preferred embodiments, the second end 24 of the tube 20 is first closed by cap-welding or other method prior to insertion of the insulators 16A, 16B, before the insulator 16A, the conductive wires 14, and the sensing element 12 are inserted. Additionally, as discussed above, one or more third insulator portions 16C can also be inserted (not shown in FIG. 6) into the tube 20 and positioned adjacent to a closed second end 24 prior to insertion of the other insulator portions 16A, 16B.

As shown in FIGS. 5A, 5B, and 6, the inserted insulator 16 is positioned within the tube 20 in the second portion 28 having initial diameter D2', a gap 34 is formed between the tube 20 and the insulator 16B since the outer diameter D4 of the insulator 16B is less than the increased initial diameter D2' of the second portion 28. While a gap may also exist between the initial inner diameter D1' of the first portion 26 and the outer diameter D4 of the insulator 16A, the gap 34 in the second portion 28 is greater due to the initial diameter D2' being greater than the initial inner diameter D1'.

The initial outer diameter D3' is reduced to a predetermined outer diameter D3 which also results in the crushing of insulator 16 (or 16A, 16B, and 16C) into a powder. The reduction of the initial outer diameter D3' can be achieved by swaging, rolling, spin forming, metal flowing or drawing. For example, in one embodiment, the tube 20 is placed in a swage die (not shown) and is swaged from the second end 24 toward the first end 22. In some embodiments, this method of diameter reduction can provide less stress or pressure on the sensing element 12 and/or the conductive wires 14. The reduction of the outer diameter from D3' to D3 causes the insulator 16 to be substantially crushed into a powdery insulating material and compacts the sensing element 12 and the conductive wires 14 within the crushed and compacted insulator 16. The gap 34 formed between the tube 20 and the insulator 16 within the second portion 28 allows the insulator 16 to be crushed around the extension wires 14 and the sensing element 12 with differing compactness and pressure.

The insulator 16 is less compacted around the sensing element 12 than the conductive wires 14. The outer diameters D4 of each insulator 16 and the inside diameters D1' and D2' are selected to ensure that the crushing and compacting of the insulator 16 provides sufficient insulation and compacted or compressed support for the sensing element 12 and conductive wires 14 without exerting excess stress or strain on either. As such, when the initial outer diameter D3' of tube 20 is reduced, less compaction and therefore less pressure is applied to the second portion 28, and therefore less pressure will be applied to the sensing element 12 during the reduction of the initial outer diameter D1' of the tube 20.

Some embodiments of the invention can also include crimping or ring rolling the first end 22 of the tube 20 before or after reducing the initial outer diameter from D3' to outer diameter D3. In other embodiments, after the insulator 16, or various insulator portions 16A, 16B, or 16C, are placed inside the tube 20, an end seal can be inserted in the first end 22 of the tube 20. The tube 20 can also have the inner diameter of a third portion (not shown) of the tube 20 that is adjacent to the first end 22 enlarged to accept or retain the end seal (not shown but will be addressed in FIGS. 8-11 below). The inner diameter enlargement process can be similar to that associated with the second portion 28, such as by drilling, by way of example. In some embodiments, the first end 22 can also be crimped or ring rolled to compress the tube 20 about an end seal. The crimping or ring rolling of the first end 22 about the inserted end seal can, in some embodiments, prevent the end seal from being forced out of the tube 20 during the initial outer diameter D3' reduction process. As will be discussed, in some embodiments, an end seal can include one or more grooves, ridges or glands on its outer surface for engaging and sealing the first end 22.

Figure 7:
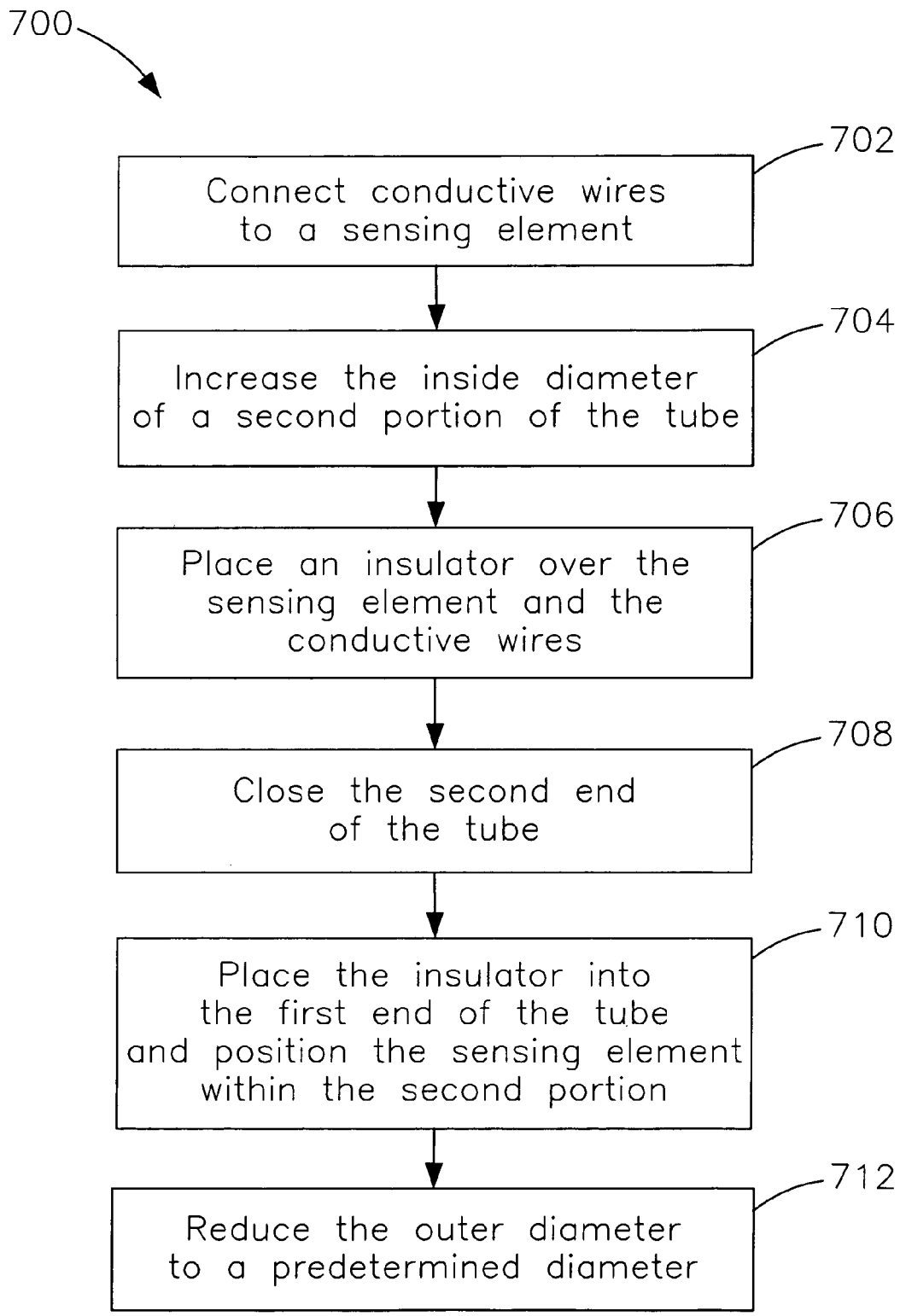
FIG. 7 is a schematic flow diagram of a method of manufacturing the temperature sensor of FIG. 1 according to the one embodiment of the invention.

FIG. 7 illustrates one embodiment of a sensor manufacturing process 700. As shown by process 700, the process can begin in 702 with the connection of each conductive wire 14 to an associated wire lead of the sensing element 12. In 704, the initial inside diameter D1' of the tube 20 is increased in the second portion 28 to D2'. The insulator 16 is placed over the sensing element 12 and the conductive wires 14 in process 706. In 708, the second end 24 of the tube 20 is closed. The insulator assembly with insulator 16, conductive wires 14, and sensing element 12 is placed into the tube 20 such that the sensing element is positioned within the second portion 28 having diameter D2' in 710. The initial outer diameter D3' is reduced to a predetermined diameter D3 in 712 and in the process crushes the insulator 16 into a powder and compacts the insulator 16 about the sensing element 12 and the conductive wires 14. As can be understood by one skilled in the art, one or more of the processes illustrated in FIG. 7 can be performed in a different order and still accomplish one or more of the manufacturing methods according to various embodiments of the invention.

Figure 8A:
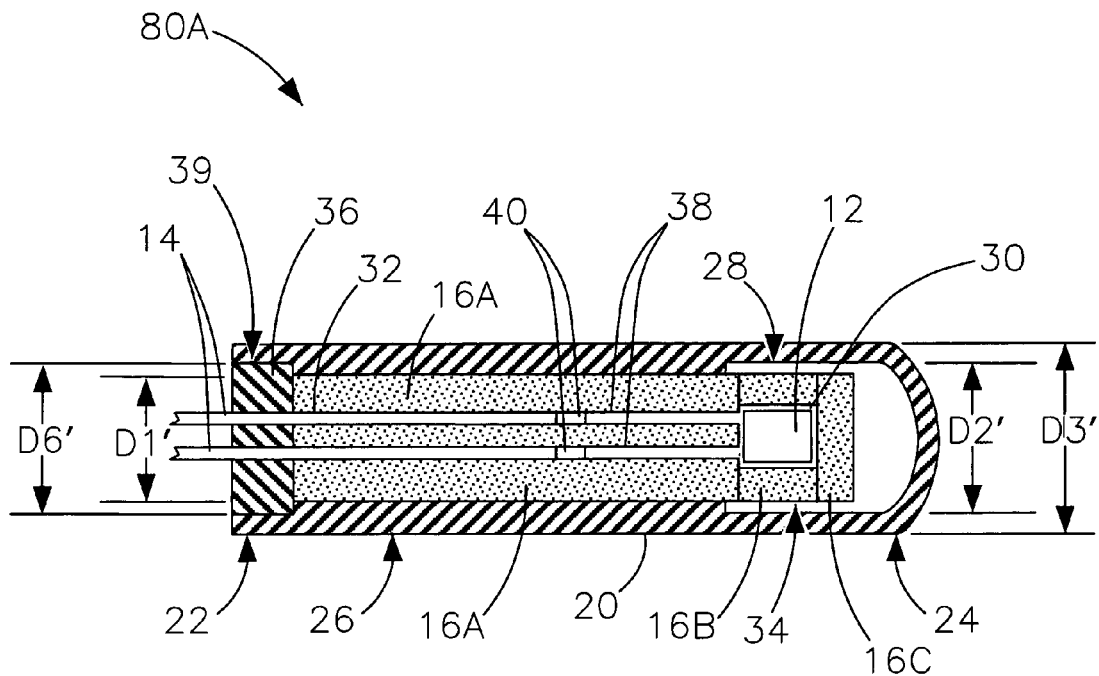
FIGS. 8A and 8B are cross-sectional views of a temperature sensor before (FIG. 8A) and after (FIG. 8B) reduction of the outer diameter in accordance with another exemplary embodiment of the invention.
Figure 8B:
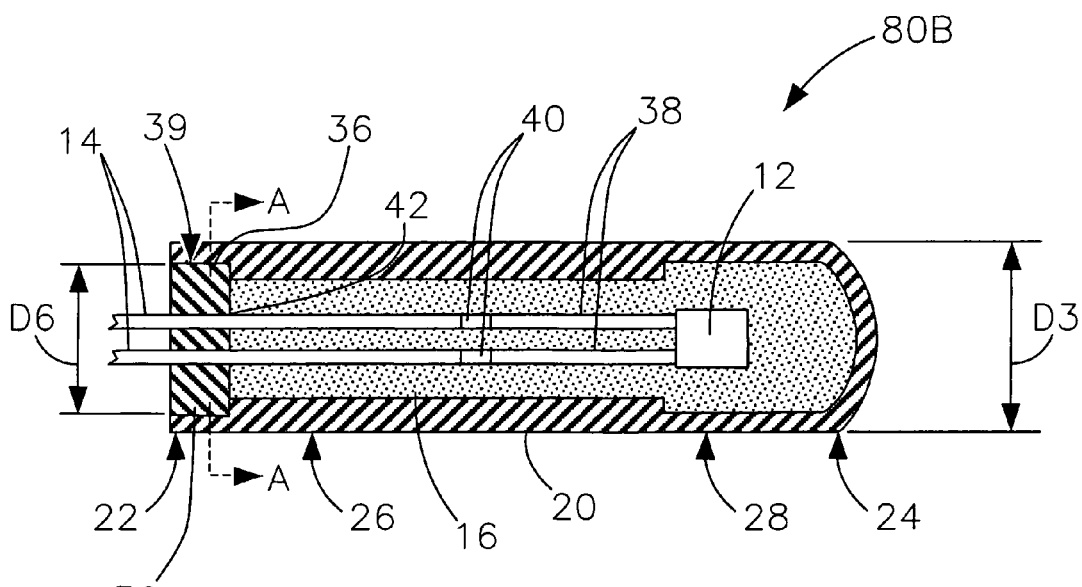
Figure 9:
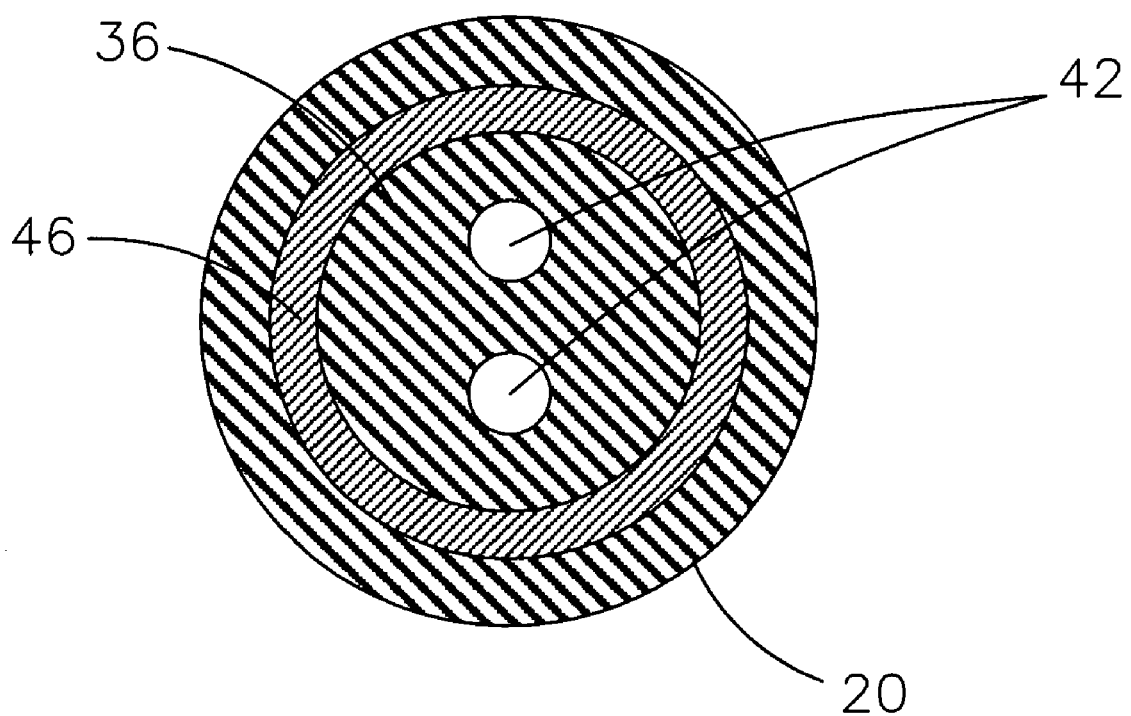
FIG. 9 is a cross-sectional view taken from line A-A of FIG. 8B, showing the cross section of a seal in the first end of the tube.
Figure 10A:
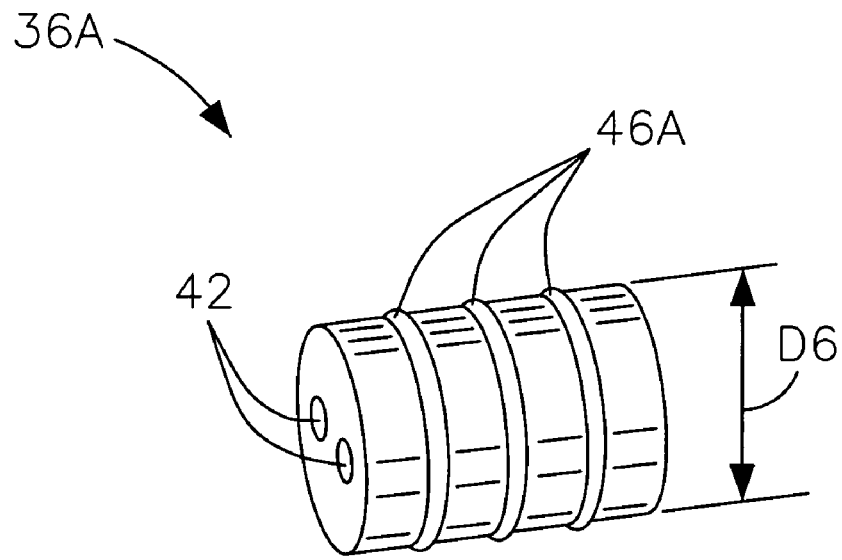
FIGS. 10A and 10B are perspective views of two seal in their initial shapes.
Figure 10B:
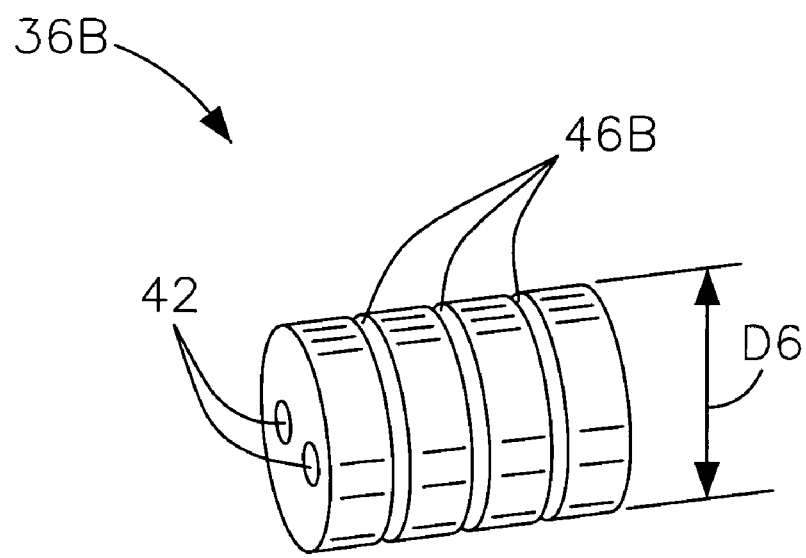

Referring to FIGS. 8A and 8B, a temperature sensor 80 (shown as 80A and 80B) in accordance with other embodiments of the invention is now described. Where the same reference numerals are used for the similar parts as described above, their functions are omitted herein for clarity. As shown in FIG. 8A, an assembled temperature sensor 80A is shown after having been assembled but before the initial outer diameter D3' has been reduced. The assembled, but not yet finished temperature sensor 80A includes the sensing element 12, insulator 16 made of compressible powdered insulating material, conductive wires 14, and a tube 20 having a first end 22, a second end 24, a first portion 26 having diameter D1' and a second portion 28 having diameter D2'. Additionally, the tube 20 also has a third portion 39 adjacent to the first end 22. The third portion 39 has an inner diameter D6' that is greater than inner diameter D1' of the first portion 26. An end seal 36 is positioned within the third portion 39 of the tube 20. Additionally, one or more crimps or ring rolls may also be made in the tube 20 to aid in retaining the end seal 36 within the first end 22 during the reduction of initial outer diameter D3'. As shown in FIGS. 9, 10A, and 10B, end seal 36 includes one or more wire channels or ports 42 that provide for the passage of conductive wires 14 through the end seal 36.

Additionally, in the exemplary embodiment of FIG. 8A, the sensing element 12 includes one or more wire leads 38. Each of these wire leads 38 is coupled to an associated conductive wire 14. In this example, each wire lead 38 is coupled to the associated conductive wire 14 by a single weld point 40. The wire leads 38, the conductive wires 14, and each weld point 40 are encased within the conductor 16. Additionally, as discussed above in more detail, in some embodiments the conductive wires 14 can include two or more segments of wire connected between the lead wires of the sensing element 12 and the temperature reading device.

As shown in FIG. 8A, the first insulator portion 16A is positioned in the first portion 26, the second insulator portion 16B is positioned in the second portion 28, and a third insulator portion 16C is positioned between the second insulator portion 16B and the second end 24 which is closed. The gap 34 exists between the second insulator portion 16B and the enlarged initial inner diameter D2'.

After the seal 36 is placed within the first end 22, the first end 22 is compressed about seal 36 and/or the tube 20 has its initial outer diameter D3' reduced to outer diameter D3 as shown in FIG. 8B. The remaining manufacturing processes can be similar to those described in connection with the exemplary embodiments as discussed above with regard to any of FIGS. 1-7.

Referring now to FIG. 8B, a sensor 80B is shown which is the sensor 80A of FIG. 8A, but sensor 80B has been through an outer diameter reduction process that reduced the initial outer diameter D3' to a smaller diameter, outer diameter D3. As shown, the three insulator portions 16A, 16B, and 16C have been crushed into a powder and compacted around the sensing element 12, the wire leads 38, the weld points 40 and the conductive wires 14. Additionally, as shown, insulator 16 has filled in the gap 34 as well as substantially all of the other voids within the tube 20. The seal 36 has been compressed in the first end 22 thereby substantially sealing the second end 24 and the tube 20.

As shown in FIGS. 8A, 8B, and 9, the seal 36 can be disposed within the tube 20 adjacent to the first end 22 and substantially seals the first end 22 of the tube 20. The seal 36 can be in the form of a short cylinder and can define one or more channels or holes 42 for each of the plurality of conductive wires 14 as shown in FIGS. 9 and 10 (10A and 10B). The conductive wires 14 extend from the wire leads 38 adjacent the second end 24 of the tube 20, along the elongated insulator 16, through the holes 42 of the seal 36, and outwardly of the first end 22 of the tube 20. Additionally, the seal 36 has an outer diameter D6 and can include one or more glands 46 that extend outward from the outer diameter D6.

The seal 36 is inserted into the first end 22 of the tube 20 after the insulator 16 is inserted into the tube 20 and before the first end 22 of the tube 20 is crimped or ring rolled and/or before the tube 20 has its initial outer diameter D3' reduced to outer diameter D3.

As shown, in FIGS. 10A and 10B, by way of example, the seal 36 (shown as 36A and 36B) can have various features. In FIG. 10A, seal 16A has an outer diameter D6 and a plurality of glands extended 46 extending outward from outer diameter D6. In FIG. 10B, end seal 36B has glands 46B that appear as ridges when defined by cuts or grooves that extend into outer diameter D6. Other embodiments of forming and defining glands 46 for seal 36 are also possible. An end seal 36 with such glands 46 can provide for improved sealing and retention within the first end 22 of the tube 20. This sealing can also include crimping or ring rolling the tube about the end seal 36 such that the glands 46 of the end seal 36 interlock with the tube 20 such that the series of glands 46 inhibit the ingress of moisture and/or vapor to the tube 20. As noted above, the end seal 36 can be made of any material, such as, by way of example, silicone, Teflon®, plastic or other material that has a sealing property and a temperature rating suitable for the application in which the sensor in intended.

Figure 11A:
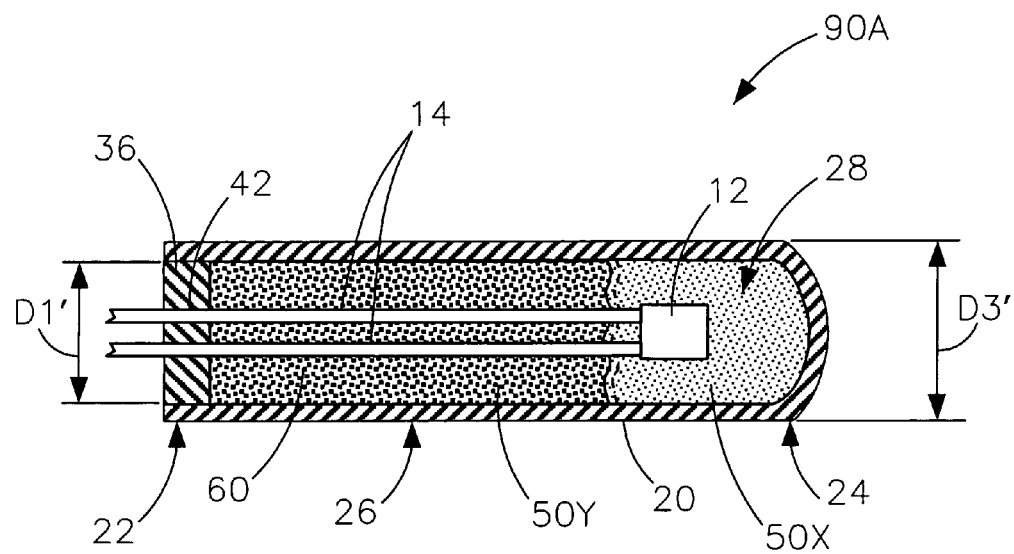
FIGS. 11A and 11B are cross-sectional views of an assembled temperature sensor prior to reduction and an assembled temperature sensor after reduction, respectively, utilizing a filled powder insulation in accordance with another exemplary embodiment of the invention.
Figure 11B:
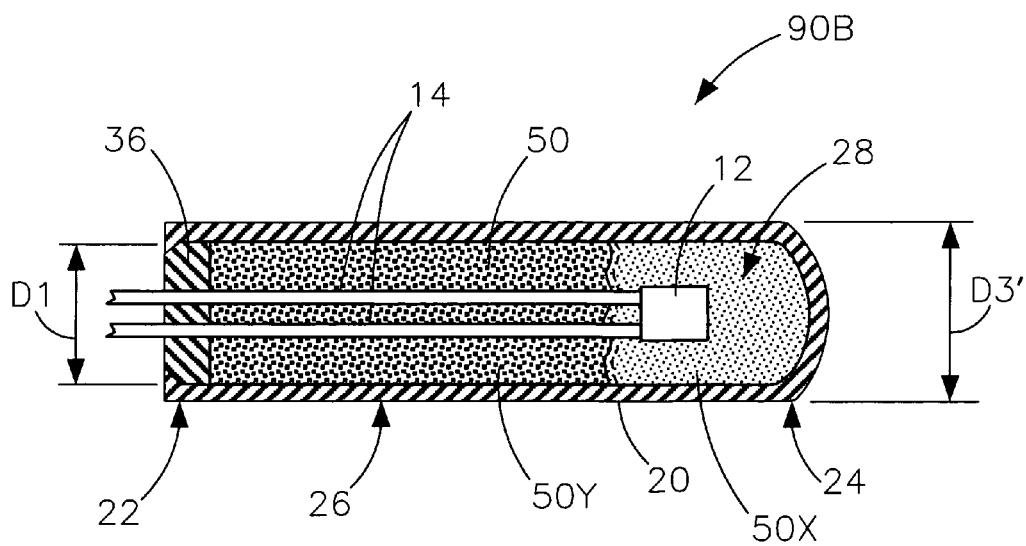

FIGS. 11A and 11B illustrate sensor 90 (shown as 90A and 90B) manufactured according to other embodiments of the invention. FIG. 11A illustrates a temperature sensor 90A after having been substantially assembled, but prior to the tube 20 being reduced in size, thereby compacting the insulating powder 50 within the tube 20. In this embodiment, the sensing element 12 is connected to the conductive wires 14 and the wires are fished through the wire channels 42 of an end seal 36. The sensing element 12 is placed within the second portion 28 of the tube 20. A space is thus formed between the tube 20 and the conductive wires 14 and the sensing element 12.

The space is filled with an insulating powder 50 and the end seal 36 is positioned within the first end 22 of the tube 20. The insulating powder 50 can be composed of, by way of example, a ceramic material, such as magnesium oxide (MgO), aluminum oxide ($Al_2O_3$), Hafnia (Hf), or boron nitride (BN). In some embodiments, the insulating powder 50 can be filled within the entire tube 20, or in other embodiments, the insulating powder 50 can be composed of two or more types of insulating powder 50. For example, in FIG. 11A the insulating powder 50 can be composed of a first insulating powder 50X which is filled into the second end 24 of the tube 20 at least up to substantially cover the sensing element 12. A second insulating powder 50Y is then filled into the tube 20 to fill the remainder portion of the tube 20 up to the first end 22 and/or the end seal 36. In some preferred embodiments, the first insulating powder 50X has a density that is less than the density of the second insulating powder 50Y. In this manner, the first insulating powder 50X would have a greater propensity to compact during the reduction in the outer diameter D3' to D3, thereby placing less stress and pressure on the sensing element 12 during reduction process.

The first end 22 can then be crimped or ring rolled about the end seal 36 to retain the end seal 36 within the tube 20. Thereafter, the initial outer diameter D3' is reduced in size to outer diameter D3 by one or more of the methods, some of which are described above. As shown in FIG. 11B, the temperature sensor 90B has had the initial outer diameter D3' reduced to outer diameter D3 thereby compressing the insulating powder 50 and compacting the sensing element 12 and the conductive wires 14 within the insulating powder 50.

Figure 12:
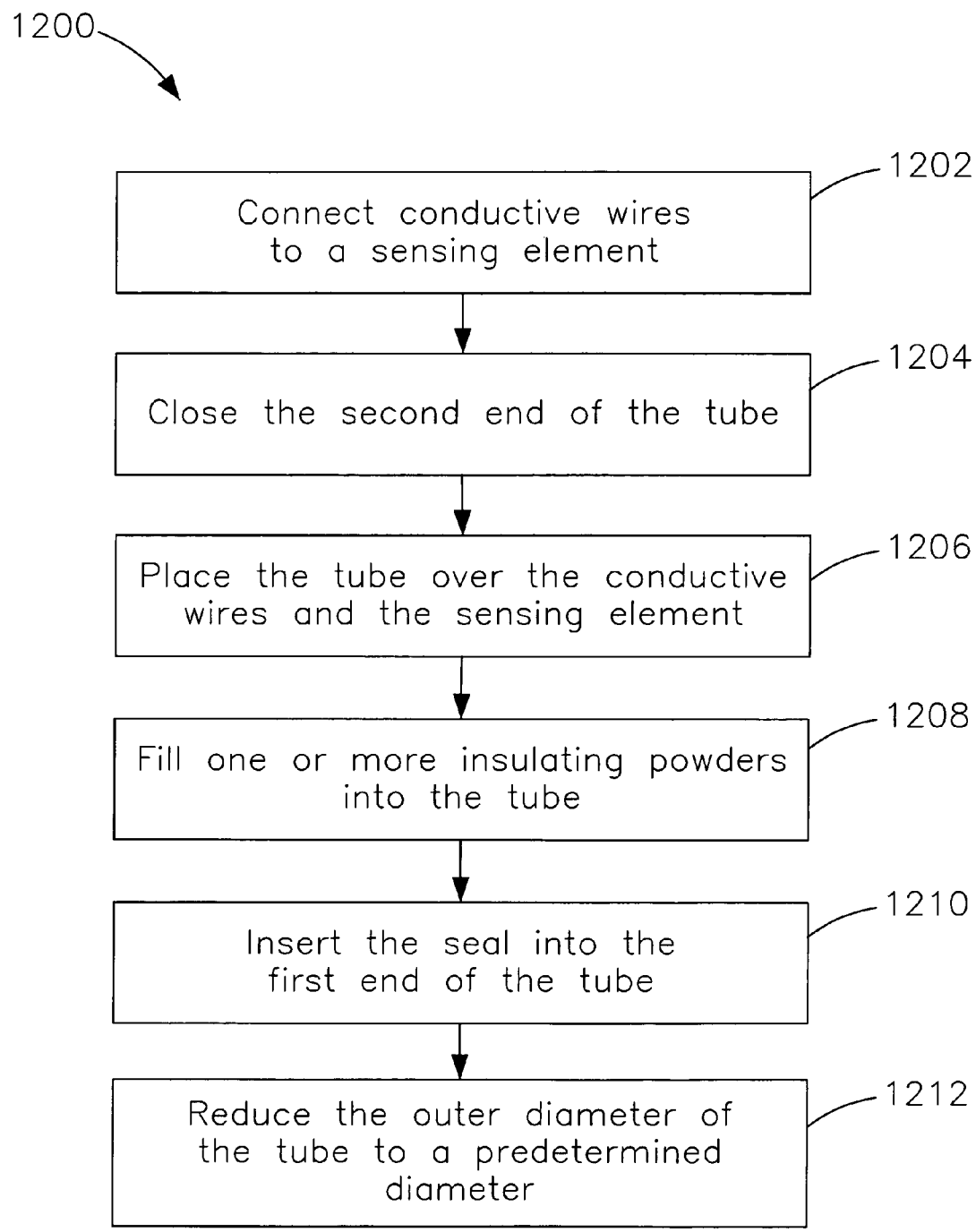
FIG. 12 is a schematic flow diagram of a method of manufacturing the temperature sensor of FIGS. 11A and 11B in accordance with one embodiment of the invention.

One embodiment of this process is illustrated in FIG. 12 by manufacturing method 1200. The method starts in 1202 with the connection of the conductive wires 14 to wire leads 38 of the sensing element 12. In 1204 the second end 24 of the tube 20 is closed and the tube 20 is placed over the conductive wires 14 and the sensing element in 1206. One or more insulating powders 50 are filled or poured into the tube 20 and about the conductive wires 14 and the sensing element 12 in 1208. An end seal 36 is inserted into the first end 22 of the tube in 1210 and the initial outer diameter D3' is reduced in 1212 to compact the insulating powder 50 about the conductive wires 14 and the sensing element 12.

Those skilled in the art will recognize that various changes can be made to the exemplary embodiments, as shown in the various Figures and herein described without departing from the scope of the invention. Accordingly, all matter contained in the above description or shown in the accompanying drawings should be interpreted as illustrative and not in a limiting sense.

When describing elements or features of the present invention or embodiments thereof, the articles "a", "an", "the", and "said" are intended to mean that there are one or more of the elements or features. The terms "comprising", "including", and "having" are intended to be inclusive and mean that there may be additional elements or features beyond those specifically described.

It is further to be understood that the steps described herein are not to be construed as necessarily requiring their performance in the particular order discussed or illustrated. It is also to be understood that additional or alternative steps may be employed.

What is claimed is:

1. A temperature sensor comprising:
   an autonomous temperature sensing element;
   a plurality of conductive wires for coupling the sensing element to a temperature reading device;
   an electrical insulator surrounding the sensing element and the conductive wires for holding the conductive wires and the sensing element in place, the insulator including substantially compacted powder insulation; and
   a tube encasing the insulator in a compacted manner and having a first end, a second end, a first portion having a first inside diameter located in the proximity of the first end, and a second portion having a second inside diameter, said second inside diameter being greater than said first inside diameter, wherein the sensing element is positioned within the second portion of the tube and the insulator being in contact with an inner surface of the tube.

2. The temperature sensor of claim 1 wherein the sensing element includes wire leads each of which is coupled to an associated conductive wire by at least one weld point, the weld points being surrounded by the insulator.

3. The temperature sensor of claim 1, further comprising a seal substantially sealing the second end of the tube, said tube encasing the seal in a compressed manner, said seal defining a channel for each of the plurality of conductive wires, each channel containing one of the conductive wires, wherein each conductive wire extends from the seal and from the first end of the tube.

4. The temperature sensor of claim 3 wherein the seal is made of a material selected from the group consisting of silicone, synthetic fluoropolymer, and plastic.

5. The temperature sensor of claim 3 wherein the seal has an outer surface defining a series of grooves, wherein the tube is crimped or ring rolled at the second end and compresses the seal within the tube, said series of grooves forming a series of gland seals between the seal and the tube.

6. The temperature sensor of claim 1 wherein the tube is cap-welded at the second end.

7. The temperature sensor of claim 1 wherein the autonomous temperature sensing element is selected from the group consisting of a resistance temperature detector (RTD), a thermistor, a diode, and a transistor.

8. The temperature sensor of claim 1 wherein the sensing element is a resistance temperature device (RTD) selected from the group consisting of a thin film RTD and a wire wound RTD.

9. The temperature sensor of claim 1 wherein the insulator includes a ceramic material selected from the group consisting of magnesium oxide (MgO), aluminum oxide ($Al_2O_3$), Hafnia (Hf), and boron nitride (BN).

10. The temperature sensor of claim 1 wherein the conductive wires include a material selected from the group consisting of nickel, Alloy 19, Alloy 20, Alloy 600, and platinum.

11. The temperature sensor of claim 1 wherein the tube includes a material selected from a group consisting of stainless steel, Alloy 600, nickel alloy, and platinum.

12. The temperature sensor of claim 1 wherein the insulator is compacted to substantially fill voids within the tube.

13. A method of manufacturing a temperature sensor having an autonomous temperature sensing element, conductive wires, an electrical insulator and a tube having an inside diameter, an outer diameter, a first end, and a second end, the method comprising:
   connecting the conductive wires to the autonomous temperature sensing element;
   increasing the inside diameter of a second portion of the tube adjacent to the second end;
   placing the insulator over the sensing element and the conductive wires;
   closing the second end of the tube;
   placing the insulator into the first end of the tube, said sensing element being positioned within the second portion of the tube; and
   reducing the outer diameter of the tube to a predetermined diameter, said reducing crushing and compressing the insulator into a powder compacted about the sensing element and the conductive wires and the compacted powder being in contact with an inner surface of the tube.

14. The method of claim 13 wherein the insulator includes a first insulator including a cavity dimensioned for receiving the sensing element and a second insulator defining a wire channel for receiving each of the conductive wires, said placing including positioning the sensing element within the cavity of the first insulator and placing the wires within the channel of the second insulator.

15. The method of claim 13 wherein the length of the second portion is equal to or greater than the length of the sensing element.

16. A temperature sensor manufactured according to the method of claim 13.

17. A method of manufacturing a temperature sensor having a temperature sensing element, conductive wires, an electrical insulator, and a tube having an inside diameter, an outer diameter, a first end, and a second end, wherein the tube initially has a substantially consistent inside diameter, the method comprising:
   connecting the conductive wires to the temperature sensing element;
   increasing the inside diameter of the tube along a second portion adjacent the second end;
   closing the second end of the tube;
   placing the insulator over the conductive wires and the temperature sensing element;
   inserting the insulator into the tube; and reducing the outer diameter of the tube to a predetermined diameter, said reducing including crushing the insulator into a powder and compacting the temperature sensing element and the conductive wires within the crushed insulator powder and the crushed insulator being in contact with an inner surface of the tube.

18. The method of claim 17 wherein the insulator includes a monolithic body when placed within the tube and wherein crushing includes reducing the monolithic body into a substantially powdery insulation which is compressed within voids of the tube and about the sensing element and conductive wires.

19. The method of claim 17 wherein the insulator includes a first insulator defining a sensing element cavity dimensioned to encase the sensing element and a second insulator defining wire channels and wherein said placing includes inserting the sensing element within the sensing element cavity of the first insulator and inserting the conductive wires within the wire channels of the second insulator.

20. The method of claim 17 wherein the insulator includes a first insulator and a second insulator, said second insulator defining a cavity dimensioned to receive the sensing element and wire channels, said first insulator dimensioned to substantially fill the second end of the tube, said placing including positioning the sensing element in the cavity of the second insulator and said inserting includes positioning the first insulator into the second end of the tube prior to inserting the second insulator into the tube.

21. The method of claim 17 wherein the insulator includes an end insulator, a sensing element insulator and a wire insulator, said sensing element insulator defining a cavity dimensioned to receive the sensing element, said wire insulator defining wire channels for receiving the conductive wires, said end insulator dimensioned to substantially fill the inside diameter of the second end of the tube, said placing including positioning the sensing element in the cavity of the sensing element insulator and inserting the conductive wires into the wire channels of the wire insulator, said inserting including inserting the end insulator into the second end of the tube prior to inserting the sensing element insulator and the wire insulator into the tube.

22. The method of claim 17 wherein said second portion has a second portion length equal to or greater than a length of the sensing element.

23. The method of claim 17, further comprising inserting a seal into the first end of the tube after inserting the insulator into the tube and crimping or ring rolling the first end of the tube to compress the tube about the seal, prior to reducing the outer diameter of the tube.

24. The method of claim 17 wherein said closing the second end of the tube includes cap-welding.

25. The method of claim 17, further comprising disposing an end insulator between the insulator and the second end of the tube, said end insulator being dimensioned to substantially fill the closed second end of the tube.

26. The method of claim 17 wherein reducing the outer diameter of the tube includes a process selected from the group consisting of swaging, rolling, spin forming, metal flowing and drawing.

27. A temperature sensor manufactured according to the method of claim 17.

28. A method of manufacturing a temperature sensor having an autonomous temperature sensing element, conductive wires, an electrical insulator, a seal, and a tube having a first end and a second end, a first portion having a first inside diameter located in the proximity of the first end, and a second portion having a second inside diameter, the second inside diameter being greater than the first inside diameter, comprising:

connecting the conductive wires to the autonomous temperature sensing element;
closing the second end of the tube;
placing the tube over the conductive wires and the sensing element, a space being formed between the tube and the conductive wires and the sensing element and the sensing element being disposed within the second portion;
filling an insulating powder into the space;
inserting the seal into the first end of the tube and about the conductive wires extending from the tube; and
reducing the outer diameter of the tube to a predetermined diameter, said reducing compressing the insulating powder and the end seal and compacting the sensing element and the conductive wires within the compressed insulating powder and the insulating powder being in contact with an inner surface of the tube.

29. The method of claim 28 wherein filling the insulating powder into the space includes filling a first insulating powder into the space associated with the second end of the tube and filling a second insulating powder into the space associated with the first end of the tube, said second insulating powder having a greater density than the first insulating powder.

30. A temperature sensor manufactured according to the method of claim 28.

31. A temperature sensor manufactured by a method comprising:

preparing a plurality of conductive wires, an autonomous temperature sensing element having wire leads, a wire insulator, a sensing element insulator, an end seal, and a tube having an inside diameter, an outer diameter, a first end, and a second end;
increasing the inside diameter of the tube along a second portion adjacent the second end;
capping the second end of the tube;
connecting each conductive wire to an associated wire lead of the sensing element;
placing the conductive wires within wire holes defined by the wire insulator and the end seal;
placing the sensing element into a cavity defined by the sensing element insulator;
inserting the sensing element, the wire insulator, and the end seal into the tube; and
reducing the outer diameter of the tube to a predetermined diameter, said reducing including crushing the wire insulator and the sensing element insulator into a compressed substantially powdery insulation, the insulation being in contact with an inner surface of the tube, said reducing including compacting the sensing element and the conductive wires within the compressed insulation and compressing the seal for substantially sealing the first end of the tube.

32. The temperature sensor of claim 31 manufactured by the method of claim 31, wherein the increased inside diameter second portion of the tube is dimensioned in length to encase the sensing element when inserted within the tube.

33. A method of manufacturing a temperature sensor having a sensing element, conductive wires, an insulator, and a tube having an inside diameter, an outer diameter, a first end, and a second end, the method comprising:

connecting the conductive wires to the sensing element;
increasing the inside diameter of a portion of the tube adjacent to the second end, said increased inside diameter portion being dimensioned as a function of the length of the sensing element and the position of the sensing element within the tube;

closing the second end of the tube;

placing the insulator over the conductive wires and the sensing element;

inserting the insulator within the tube with the sensing element disposed within the increased inside diameter portion of the tube; and reducing the outer diameter of the tube to a predetermined diameter, said reducing including crushing and compressing the insulator and compacting the sensing element and the conductive wires within the crushed insulator and the crushed insulator being in contact with an inner surface of the tube.

34. A temperature sensor manufactured according to the method of claim 33.

35. A method of manufacturing a temperature sensor having a sensing element, conductive wires, an insulator, and a tube initially having a substantially consistent inside diameter, an outer diameter, a first end, and a second end; the method comprising:

connecting the conductive wires to the sensing element;

increasing the inside diameter of a portion of the tube adjacent to the second end, said increased inside diameter portion being dimensioned as a function of the length of the sensing element and the position of the sensing element within the tube;

closing the second end of the tube;

placing the tube over the conductive wires and the sensing element, a space being formed between the tube and the conductive wires and the sensing element and the sensing element being disposed within the increased inside diameter portion of the tube;

filling an insulating powder into the space; and reducing the outer diameter of the tube to a predetermined diameter, said reducing crushing and compressing the insulating powder and compacting the sensing element and the conductive wires by the insulating powder and the insulating powder being in contact with an inner surface of the tube.

36. The method of claim 35 wherein filling the insulating powder into the space includes filling a first insulating powder into the space associated with the second end of the tube and filling a second insulating powder into the space associated with the first end of the tube, said second insulating powder having a greater density than the first insulating powder.

37. A temperature sensor manufactured according to the method of claim 35.

* * * * *